(12) United States Patent
Tanaka et al.

(10) Patent No.: US 6,796,181 B2
(45) Date of Patent: Sep. 28, 2004

(54) ACCELERATION SENSOR

(75) Inventors: Hiroshi Tanaka, Suzaka (JP); Hiroshi Ishikawa, Kawasaki (JP); Osamu Ikata, Kawasaki (JP)

(73) Assignees: Fujitsu Limited, Kanagawa (JP); Fujitsu Media Devices Ltd., Nagano (JP)

( * ) Notice: Subject to any disclaimer, the term of this patent is extended or adjusted under 35 U.S.C. 154(b) by 0 days.

(21) Appl. No.: 10/322,632

(22) Filed: Dec. 19, 2002

(65) Prior Publication Data
US 2003/0106373 A1 Jun. 12, 2003

Related U.S. Application Data

(63) Continuation of application No. 09/750,178, filed on Dec. 29, 2000, now abandoned.

(30) Foreign Application Priority Data
Feb. 18, 2000 (JP) ......................................... 2000-042053

(51) Int. Cl.[7] .............................................. G01P 15/09
(52) U.S. Cl. ..................................... 73/514.34; 310/329
(58) Field of Search .......................... 73/514.34, 514.16, 73/514.01; 310/311, 329, 333; 367/180

(56) References Cited

U.S. PATENT DOCUMENTS

| | | |
|---|---|---|
| 3,805,097 A | 4/1974 | Yanchich et al. |
| 4,676,104 A | 6/1987 | Cullen |
| 5,663,507 A | 9/1997 | Westervelt et al. |
| 5,911,158 A | 6/1999 | Henderson et al. |

FOREIGN PATENT DOCUMENTS

| | | |
|---|---|---|
| DE | 195 25 147 A1 | 1/1996 |
| DE | 196 51 752 A1 | 6/1997 |
| EP | 0 932 044 A1 | 7/1999 |
| JP | 6-273439 | 9/1994 |
| JP | 1096742 | 4/1998 |
| JP | 11-51960 | 2/1999 |
| JP | 11-211748 | 8/1999 |

*Primary Examiner*—John E. Chapman
(74) *Attorney, Agent, or Firm*—Arent Fox PLLC

(57) ABSTRACT

An acceleration sensor includes a piezoelectric single-plate having a weight part and a detection part. The piezoelectric single-plate is, for example, an X-cut plate of $LiNbO_3$.

18 Claims, 24 Drawing Sheets

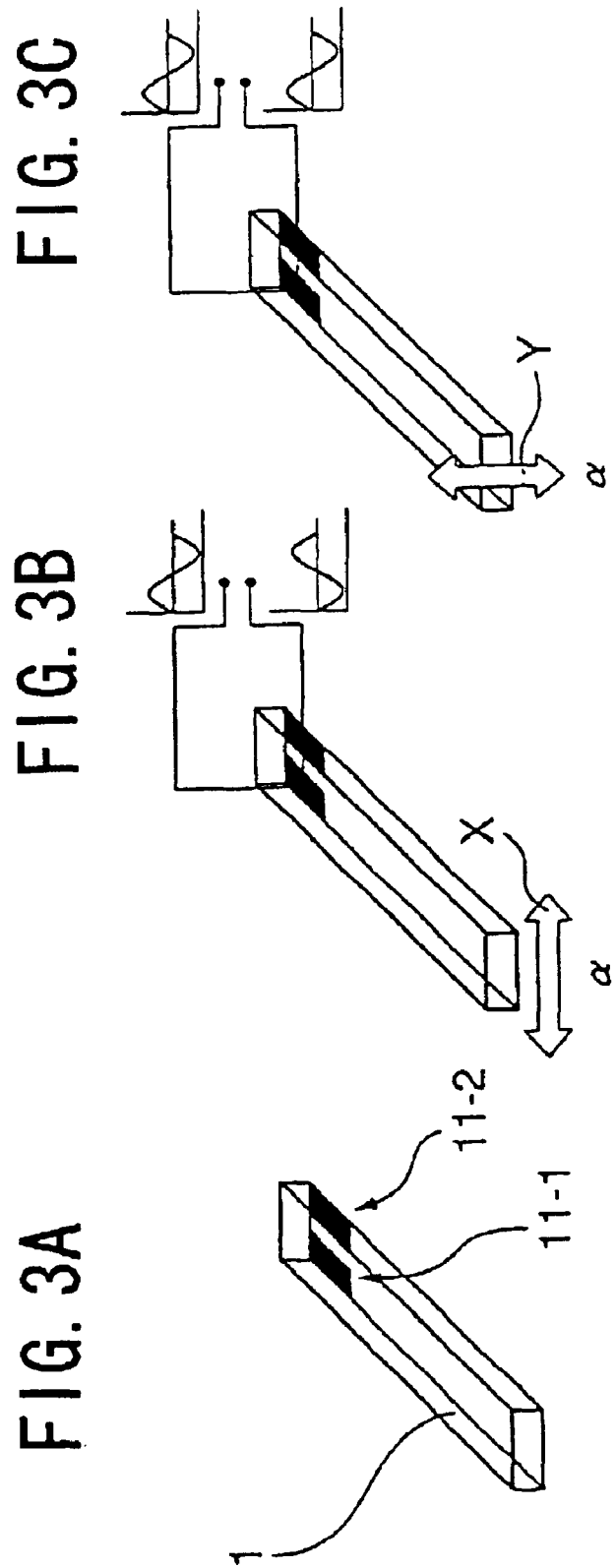

13t>11t

ACCELERATION SENSOR

This is a Continuation of application Ser. No. 09/750,178 filed Dec. 29, 2000 now ABN. The disclosure of the prior application is hereby incorporated by reference herein in it entirety.

BACKGROUND OF THE INVENTION

1. Field of the Invention

The present invention generally relates to an acceleration sensor which senses a shock or acceleration applied to an object. More particularly, the present invention is concerned with an acceleration sensor of a piezoelectric type that senses the amount of feature produced by inertia force caused in an object due to an acceleration.

Recently, downsizing of electronic apparatuses has progressed and portable electronic apparatuses such as notebook-type personal computers have been spread. Usually, the portable electronic apparatuses are designed to sense a shock unexpectedly applied thereto and carry out a given process in order to maintain the reliability. For example, if a hard disk drive built in a notebook type personal computer gets a shock, the current write/reproduction operation is interrupted, and rather a process for avoiding occurrence of error is initiated. An acceleration sensor can be used to sense a shock applied to the hard disk drive. The acceleration sensor can also be used to sense a shock in order to promptly activate an airbag apparatus for protecting a passenger of a vehicle from a shock applied thereto due to an accident.

The recent downsized electronic apparatuses require compact, thin, less-expensive acceleration sensors while retaining the original sense performance.

2. Description of the Related Art

Various types of acceleration sensors are known. Recently, an acceleration sensor of a piezoelectric type has begun to attract notice. Japanese Laid-Open Patent Application No. 11-51960 discloses an acceleration sensor that has a piezoelectric element to which a weight element is attached. The acceleration sensor senses acceleration using inertia force caused in the sharing direction between the weight element and the piezoelectric element at the time of receiving a shock.

Japanese Laid-Open Patent Application No. 10-96742 or Japanese Laid-Open Patent Application No. 11-211748 discloses an acceleration sensor which has a piezoelectric element consisting of piezoelectric plates bonded together and senses acceleration from a deflection of the piezoelectric element at the time of vibration.

Japanese Laid-Open Patent Application No. 6-273439 discloses an acceleration sensor which has a cantilever structure of a piezoelectric element consisting of piezoelectric plates bonded together and which senses acceleration from a deflection of the piezoelectric element which is deformed due to inertia force.

However, the conventional types of acceleration sensors mentioned above have the following disadvantages.

The acceleration sensor disclosed in Japanese Laid-Open Patent Application No. 11-51960 or the like needs a troublesome work of attaching the weight element to the piezoelectric element. In addition, the weight element is required to have a weight sufficient to cause shearing force appropriately corresponding to acceleration in order to sense acceleration at a given sensitivity. Thus, the acceleration sensor is heavy. Therefore, it can be concluded that the acceleration sensor of this time has difficulty in realizing lightweight, thin acceleration sensors.

The acceleration sensors of the type in which acceleration is sensed from deflection of the piezoelectric element are required to laminate a plurality of very thin piezoelectric plates in order to cause the piezoelectric element using the laminated plates to be sufficiently deflected in response to acceleration. The laminated structure can be produced only by a very complex process and is thus expensive.

SUMMARY OF THE INVENTION

A general object of the present invention is to provide an acceleration sensor in which the above disadvantages are eliminated.

A more specific object of the present invention is to provide a compact, thin, less-expensive acceleration sensor having improved sensitivity.

The above objects of the present invention are achieved by an acceleration sensor including a piezoelectric single-plate having a weight part and a detection part. The piezoelectric single-plate is, for example, an X-cut plate of $LiNbO_3$.

BRIEF DESCRIPTION OF THE DRAWINGS

Other objects, features and advantages of the present invention will become more apparent from the following detailed description when read in conjunction with the accompanying drawings, in which:

FIGS. 3A, 3B and 3C are respectively perspective views of acceleration sensors according to a first embodiment of the present invention;

DESCRIPTION OF THE PREFERRED EMBODIMENTS

First, a description will be given, with reference to FIGS. 1A, 1B, 2A and 2B, of the principle of an acceleration sensor of the present invention.

Figure 1B:
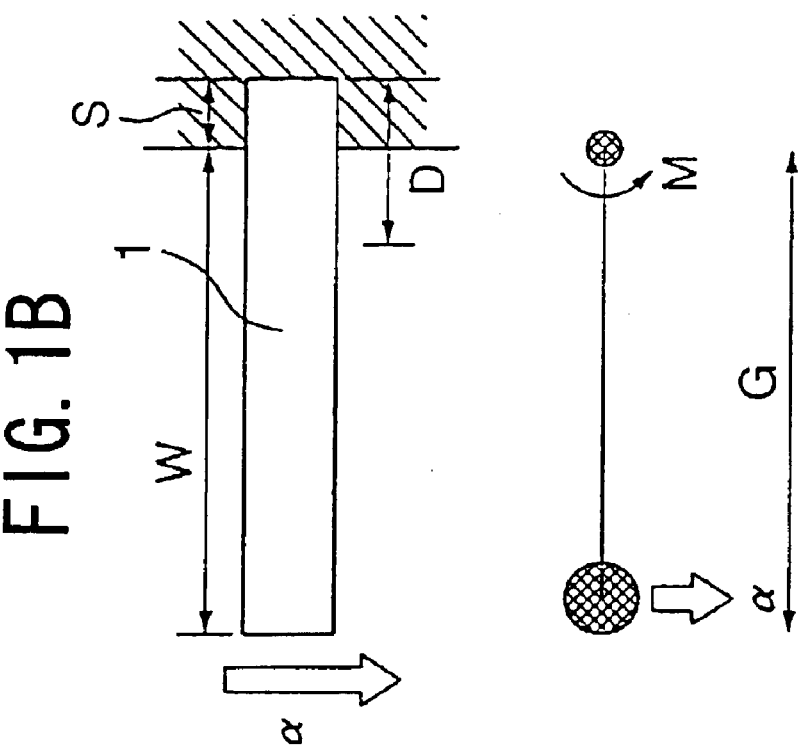
FIG. 1B is a diagram of inertia force caused in the piezoelectric single-plate which receives acceleration.
Figure 1A:
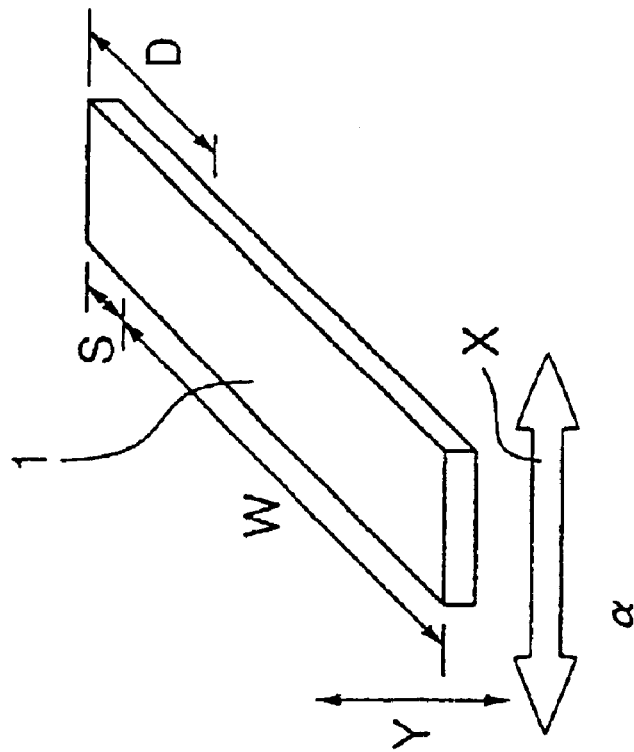
FIG. 1A is a perspective view of a single plate of a piezoelectric single-plate onto which acceleration is exerted.

FIG. 1A is a perspective view showing an acceleration a is applied to a piezoelectric plate 1, and FIG. 1B is a diagram describing inertia force caused in the piezoelectric plate 1 with acceleration α being applied thereto.

Referring to FIG. 1A, the piezoelectric plate 1 is formed by shaping a piezoelectric single element in a rectangular shape, and has main surfaces which include an X-axis direction (main-axis direction X) in which acceleration a to be detected is applied and are arranged in parallel with the main-axis direction X. The piezoelectric plate 1 has a large electromechanical coupling coefficient in the main-axis direction, while the electromechanical coupling coefficient in another axis direction Y (Y-axis direction) perpendicular to the main surfaces is approximately zero.

The acceleration sensor of the invention principally senses acceleration α as follows. When acceleration α is applied to a weight portion of the piezoelectric plate 1, a strain dependent on acceleration α is caused in a detection portion D of the piezoelectric plate 1. The acceleration α is sensed by detecting a charge (electric signal) caused by the strain.

A supporting area S is defined in which the piezoelectric single-plate 1 is supported as will be described later. When acceleration α is applied to the piezoelectric single-plate 1 supported in the supporting area S, a maximum strain is caused in the vicinity of an end of the supporting area S (the side of the supporting area S closer to the weight portion W). The acceleration α can be sensed by detecting an electric signal produced in the portion of the piezoelectric single-plate 1 in which the maximum strain is caused. The detection portion D of the acceleration sensor of the invention relatively depends on the basis of the supporting area in which the piezoelectric single-plate 1 is supported. When the supporting area S is determined, the weight portion W is then determined.

FIG. 1B shows the above-mentioned relationship between the detection portion D and the supporting area S. More particularly, FIG. 1B shows the piezoelectric single-plate 1 supported in a cantilever fashion. The upper part of FIG. 1B shows a state in which acceleration α is applied to the piezoelectric single-plate 1, and the lower part thereof schematically shows a relationship among inertia force M, mass m of weight portion M, and length G from the center of swinging to the center of gravity of the weight portion W, assuming that all mass m of the weight portion W is located in the center of gravity.

The magnitude of inertia force M is proportional to acceleration α applied to the mass m of a body (weight part W) and the length G from the center of swinging and the center of gravity of the weight part W (M=αm×G). The inertia force M causes the maximum strain in the detection part D. Thus, acceleration α can be detected by detecting the electric signal caused by the strain in the detection part D. The mass m of the weight part W is assumed to be located in the center of gravity thereof, and the inertia force M can be expressed as M=αm×G. The piezoelectric single-plate does not have a laminated structure but is a single-plate. Thus, the sensitivity of the acceleration sensor can be improved by lengthening the length G and thus increasing the inertia force M.

Figure 2A:
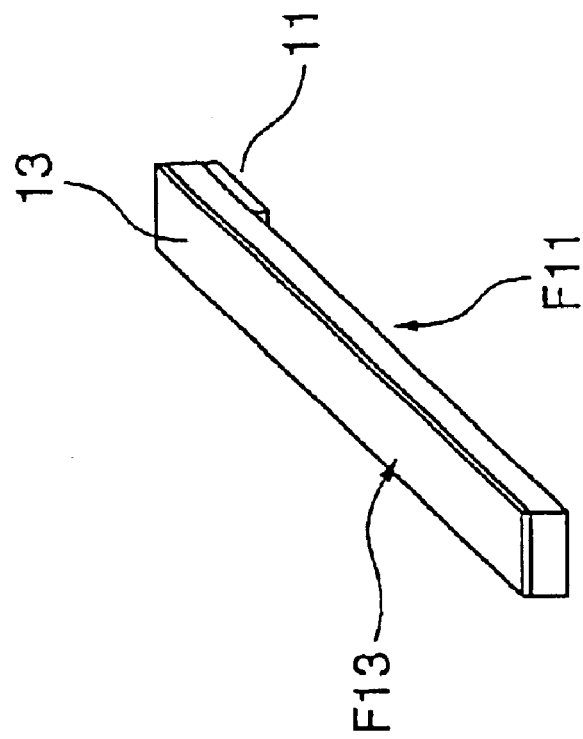
FIG. 2A is a graph of a strain distribution observed when acceleration is applied to the piezoelectric single-plate.

FIG. 2A shows a strain distribution observed when acceleration α is applied to the piezoelectric single-plate 1 supported in the supporting area S. The position in which the maximum strain is caused is an end of the weight part W located in the supporting area S. The detection part D includes a part in which a large strain is caused. In a case where a detection electrode 11 shown in FIG. 2B is disposed so as to overlap with the end of the weight part W in which the maximum strain is caused, acceleration α can be sensed more reliably.

Figure 2B:
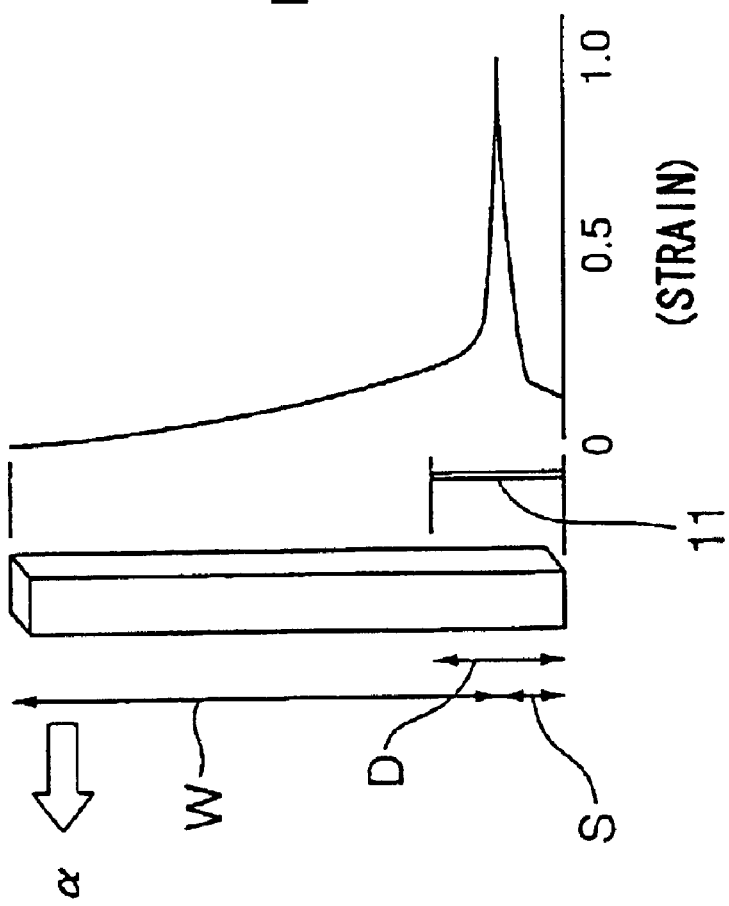
FIG. 2B is a perspective view of an arrangement of a detection electrode and a ground electrode of an acceleration sensor.

Preferably, as shown in FIG. 2B, a ground electrode is provided on a surface F13 opposite to a surface F11 on which the detection electrodes 11 are provided. In addition, another ground electrode may be formed on the surface F11. Thus, it is possible to improve the signal-to-noise (S/N) ratio. The ground electrodes 13 may be a chromium/metal layer formed by evaporation or electrolytic plating without patterning. Thus, the mass productivity can be improved and cost reduction can be facilitated.

It is supposed that crosstalk caused in the abovementioned acceleration sensor results from a charge produced by vibration in the thickness direction caused by acceleration applied in this direction. However, it is to be noted that the piezoelectric single-plate 1 has an electromechanical coupling coefficient of approximately zero with respect to vibration in the thickness direction. Thus, the acceleration sensor of the invention has greatly reduced crosstalk.

It will be noted that the present invention acceleration sensor has the principle of detection that is quite different from that of the conventional acceleration sensors. This will be described below in detail. A conventional cantilever-type acceleration sensor is designed to sense acceleration applied along the surfaces of a rectangular piezoelectric element (which corresponds to the Y-axis direction in which acceleration is not expected to be sensed). In contrast, the acceleration sensor of the invention is designed to sense acceleration applied in the width direction of the piezoelectric single-plate 1. Also, the conventional acceleration sensors employ the laminated piezoelectric elements or the weight in order to get a large magnitude of inertia force. In contrast, the present invention employs the piezoelectric single-plate 1 which includes the weight part W as well as the detection part D. In other words, the weight part W and the detection part D are integrally incorporated in the piezoelectric single-plate 1. This contributes to reduction in thickness.

A description will be given of embodiments of the present invention. The following embodiments utilize an X-cut plate of a single crystal of $LiNbO_3$ as the piezoelectric singleplate 1 (hereinafter such a single plate will be simply referred to as an LNX-cut plate). Of course, the piezoelectric single-plate 1 is not limited to the LNX-cut plate but may be made of another material such as a single crystal of $LiTaO_3$ or quartz, or piezoelectric ceramics.

(First Embodiment)

An acceleration sensor according to a first embodiment of the present invention has an arrangement, in which the detection electrode mentioned before is divided into two parts arranged side by side in the main-axis direction X in which acceleration α is applied in order to further improve sensitivity and reduce noise.

FIGS. 3A, 3B and 3C illustrate an acceleration sensor according to the first embodiment of the present invention. As shown in FIG. 3A, the detection electrode 11 is divided into two detection electrodes 11-1 and 11-2 arranged side by side in the width direction of the LNX-cut plate 1. As shown in FIG. 3B, electric signals respectively picked up via the detection electrodes 11-1 and 11-2 caused by acceleration a applied in the main-axis direction X are 180 degrees out of phase. As to the Y-axis direction perpendicular to the mainaxis direction X, the electric signals respectively picked up via the detection electrodes 11-1 and 11-2 are in phase. Thus, when the electric signals obtained via the detection electrodes 11-1 and 11-2 is subjected to a differential amplifying operation, the signal components involved in the main-axis are amplified, whereas the signal components in the Y-axis direction are canceled. Hence, it is possible to improve the sensitivity and reduce noise.

(Second Embodiment)

An acceleration sensor according to a second embodiment of the present invention has an arrangement, in which the detection electrode mentioned before is divided into two parts arranged side by side in a Z-axis direction perpendicular to the direction in which acceleration α is applied in order to reduce the production cost.

Figure 4:
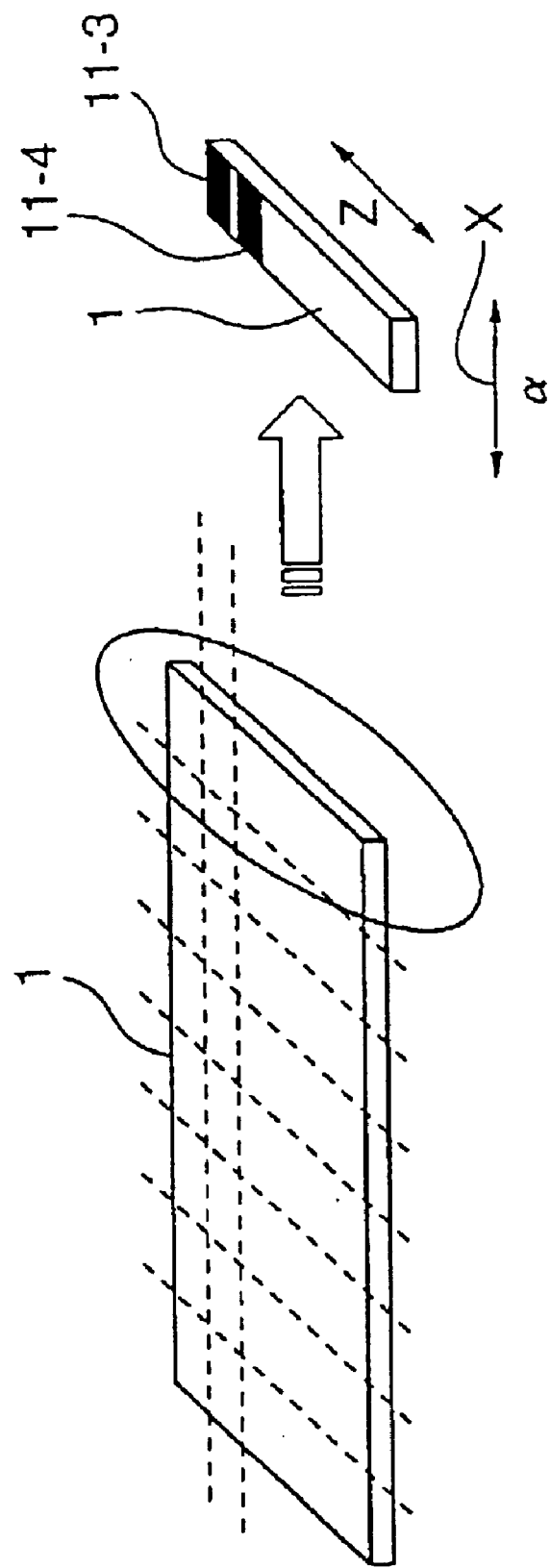
FIG. 4 is a perspective view of an acceleration sensor according to a second embodiment of the present invention.

FIG. 4 is a diagram of the acceleration sensor according to the second embodiment of the present invention. The detection electrode 11 is divided into parts 11-3 and 11-4 arranged side by side in the longitudinal direction Z of the LNX-cut plate perpendicular to the direction in which acceleration a is applied.

The detection electrodes 11-3 and 11-4 are arranged in parallel with the X-axis direction in which acceleration α is applied. Hence, it is possible to easily divide the detection electrode 11 into the parts 11-3 and 11-4 by batch processing at the time of dividing the LNX-cut plate into the individual LNX-cut plates 1 by means of a dicer or the like. Thus, mass productivity can be improved and cost reduction can be achieved.

(Third Embodiment)

An acceleration sensor according to a third embodiment of the present invention has an arrangement in which the LNX-cut plate is supported in a position which does not include the center of gravity thereof.

Figure 5B:
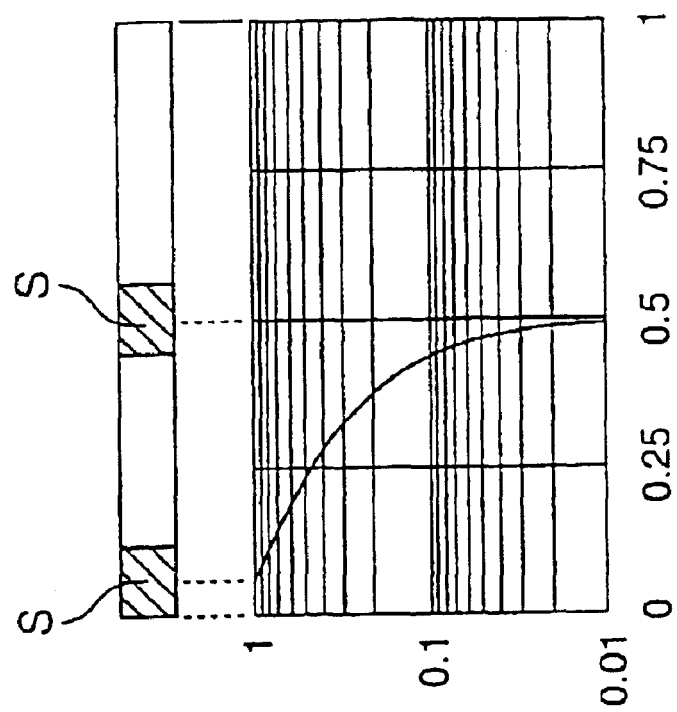
FIG. 5B is a graph of a relationship between the position of a sensor supporting area and a normalized sensor output of the acceleration sensor according to the third embodiment of the present invention.
Figure 5A:
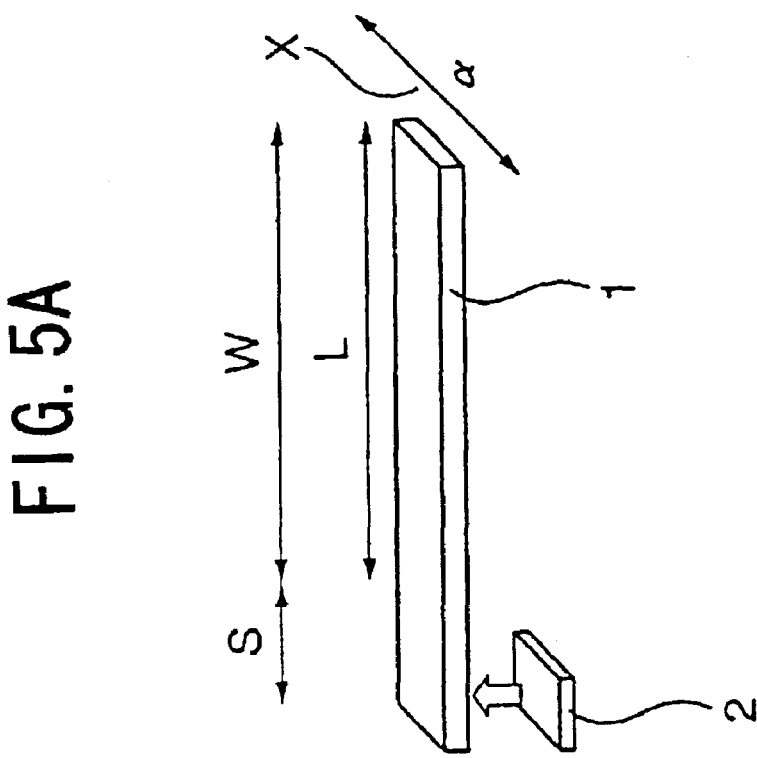
FIG. 5A is a perspective view of an acceleration sensor according to a third embodiment of the present invention.

Referring to FIG. 5A, the supporting area S is located in an end part of the LNX-cut plate 1. Thus, the effective length L of the weight part W can be lengthened, so that acceleration α can be sensed with higher sensitivity.

FIG. 5B is a graph showing a relationship between the supporting area S and normalized sensor output. The sensitivity depends on the supporting area S. More particularly, the sensitivity becomes worse as a supporting member 2 shown in FIG. 5A is positioned so as to become closer to the center of the LNX-cut plate 1. A normalized sensor output of 1 is defined when the supporting area S is located in the end part of the LNX-cut plate 1. The horizontal axis of the graph of FIG. 5B denotes the normalized supporting area S in which a normalized position of 1 corresponds to the right-side (farthest) end of the LNX-cut plate 1 from the left-side end.

(Fourth Embodiment)

An acceleration sensor according to a fourth embodiment of the present invention has an arrangement in which the LNX-cut plate is supported in a position which includes the center of gravity thereof.

Figure 6A:
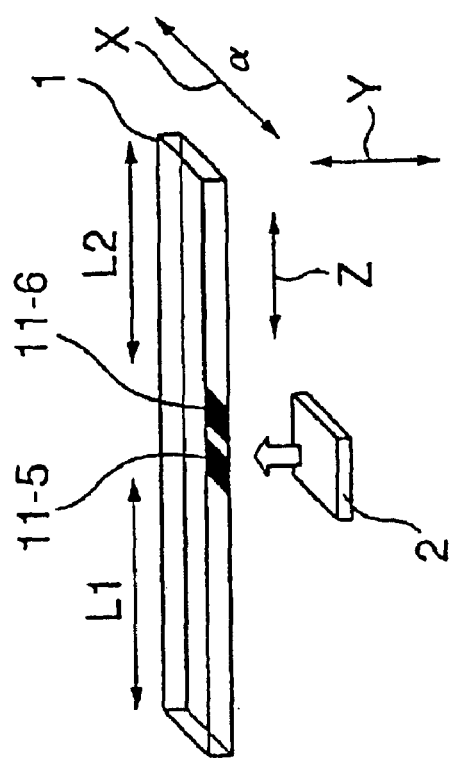
FIG. 6A is a perspective view of an acceleration sensor according to a fourth embodiment of the present invention.

Referring to FIG. 6A, the supporting area is defined so as to include the center of gravity of the LNX-cut plate 1. Detection electrodes 11-5 and 11-6 are arranged side by side in the Z-axis direction. Electric signals obtained via the detection electrodes 11-5 and 11-6 due to acceleration α applied to the Y-axis direction have identical amplitudes and opposite phases. When the electric signals are simply added, crosstalk can greatly be reduced and the S/N ratio can be improved.

Figure 6B:
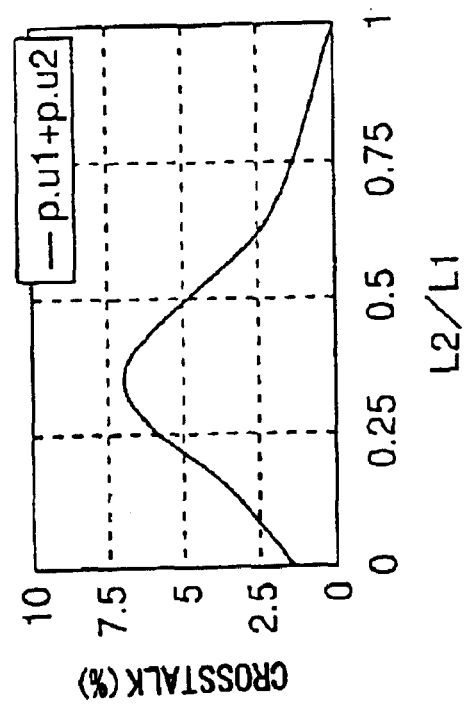
FIG. 6B is a graph of a relationship between crosstalk and the position of a sensor supporting area.

FIG. 6B is a graph of a relationship between a ratio L2/L1 and crosstalk where L1 and L2 are shown in FIG. 6A. When the detection electrodes 11-5 and 11-6 are disposed in the approximately central position of the LNX-cut plate 1, namely, when L2/L1 is equal to 1, crosstalk can be suppressed most effectively.

Figure 6C:
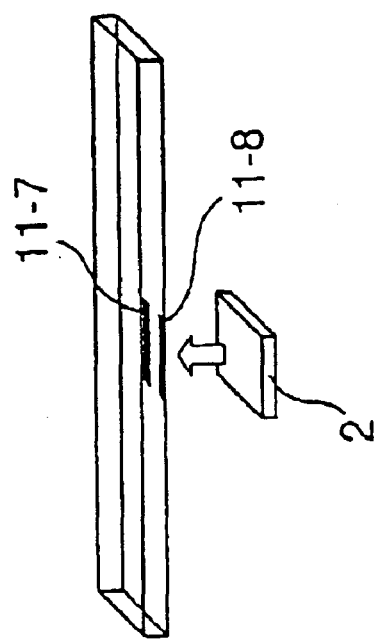
FIG. 6C is a perspective view of a variation of the acceleration sensor shown in FIG. 6A.

FIG. 6C shows an electrode arrangement directed to improving the sensitivity as well as reduction in crosstalk. The supporting area S is defined so as to include the center of gravity of the LNX-cut plate 1. Detection electrodes 11-7 and 11-8 are arranged side by side in the X-axis direction in which acceleration α is applied. Electric signals obtained via the detection electrodes 11-7 and 11-8 are 180 degrees out of phase. Electric signal components obtained via the detection electrodes 11-7 and 11-8 caused by acceleration a applied in the Y-axis direction have identical amplitudes and are in phase. Thus, the electric signals obtained via the detection electrodes 11-7 and 11-8 are differentially amplified, so that acceleration α can be sensed efficiently with crosstalk being reduced. The acceleration sensor thus configured has an improved S/N ratio.

(Fifth Embodiment)

An acceleration sensor according to a fifth embodiment of the present invention has a preferable relationship between the length LW of the weight part W and the length LS of the supporting part S. In other words, this acceleration sensor positively utilizes inertia force involved in the weight part W.

Figure 7B:
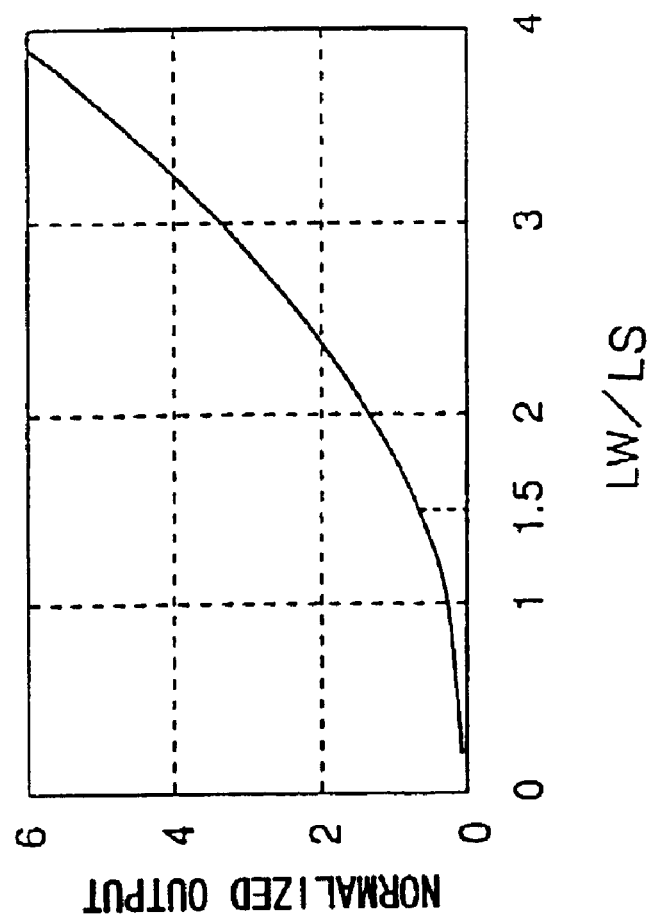
FIG. 7B is a graph between a ratio of a weight part to a detection part and a normalized sensor output of the acceleration sensor shown in FIG. 7A.
Figure 7A:
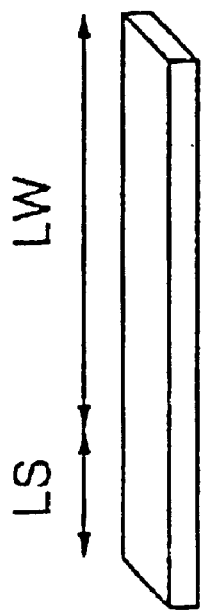
FIG. 7A is a perspective view of an acceleration sensor according to a fifth embodiment of the present invention.

As shown in FIG. 7A, the sensitivity of the acceleration sensor can be improved by selecting the length LW of the weight part W as long as possible. As shown in FIG. 7B, when the ratio of the length LW to the length LS becomes approximately equal to 1.5 or greater, the sensitivity of acceleration α can be improved more greatly. Thus, it is preferable to set the ratio LW/LS to 1.5 or greater in practice.

(Sixth Embodiment)

An acceleration sensor according to a sixth embodiment of the present invention has a preferable relationship between the detection electrode 11 and the supporting area S.

Figure 8B:
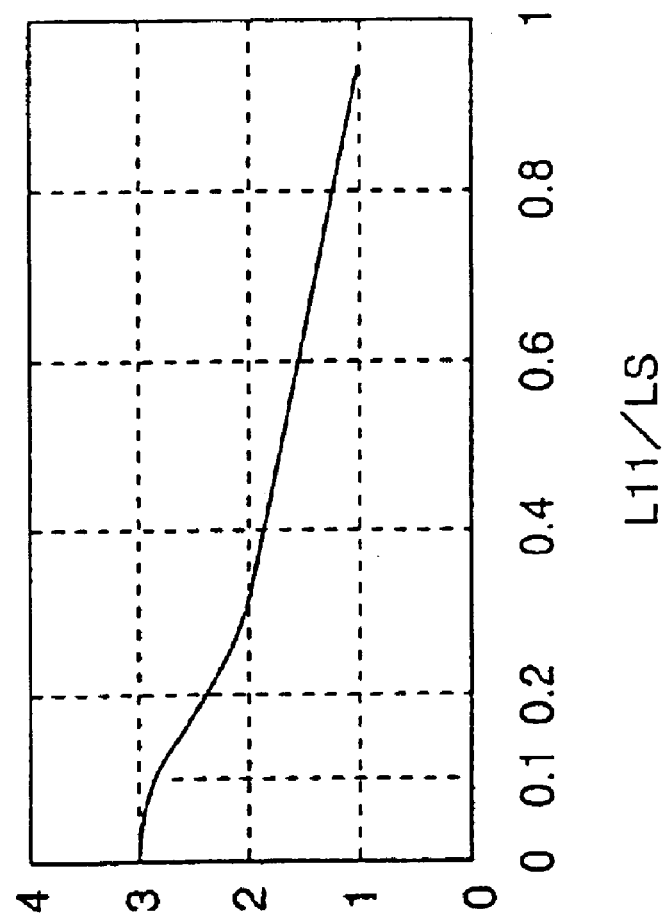
FIG. 8B is a graph between a ratio of an extending portion of the detection electrode to the length of the sensor supporting area of the acceleration sensor shown in FIG. 8A.
Figure 8A:
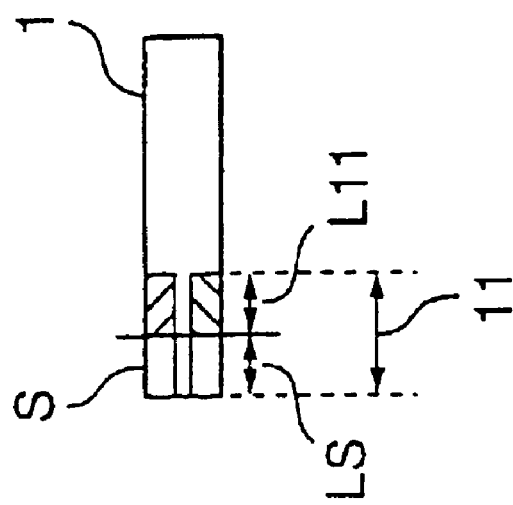
FIG. 8A is a perspective view of an acceleration sensor according to a sixth embodiment of the present invention.

Referring to FIG. 8A, the supporting area S is defined in such a way as to be positioned on the detection electrodes 11. With this arrangement, strain caused by acceleration α can be sensed efficiently. In FIG. 8A, the supporting area S is located in an end part of the LNX-cut plate 1. A reference symbol L11 denotes the length of an extension of the detection electrodes 11 extending from the end of the supporting area S. The length of the detection electrodes 11 is denoted as LS+L11.

FIG. 8B is a graph of a relationship between R11/LS and the normalized sensor output. It can be seen from FIG. 8 that the sensor sensitivity can be improved with the arrangement in which the detection electrodes 11 is located in the supporting area S and slightly extends from the end of the supporting area S closer to the weight part W. This is because inertia force M resulting from acceleration a causes the maximum strain in the end part of the supporting area S closer to the weight part W. It is preferable that the extension of the detection electrodes 11 extending from the end part of the supporting area S by 0 to 10% of the length LS of the supporting area S.

As described above, the sensitivity of the acceleration sensor can be improved by disposing the detection electrodes 11 in the supporting area S.

(Seventh Embodiment)

An acceleration sensor according to a seventh embodiment of the present invention has a unique arrangement of ground electrodes.

Figure 9:
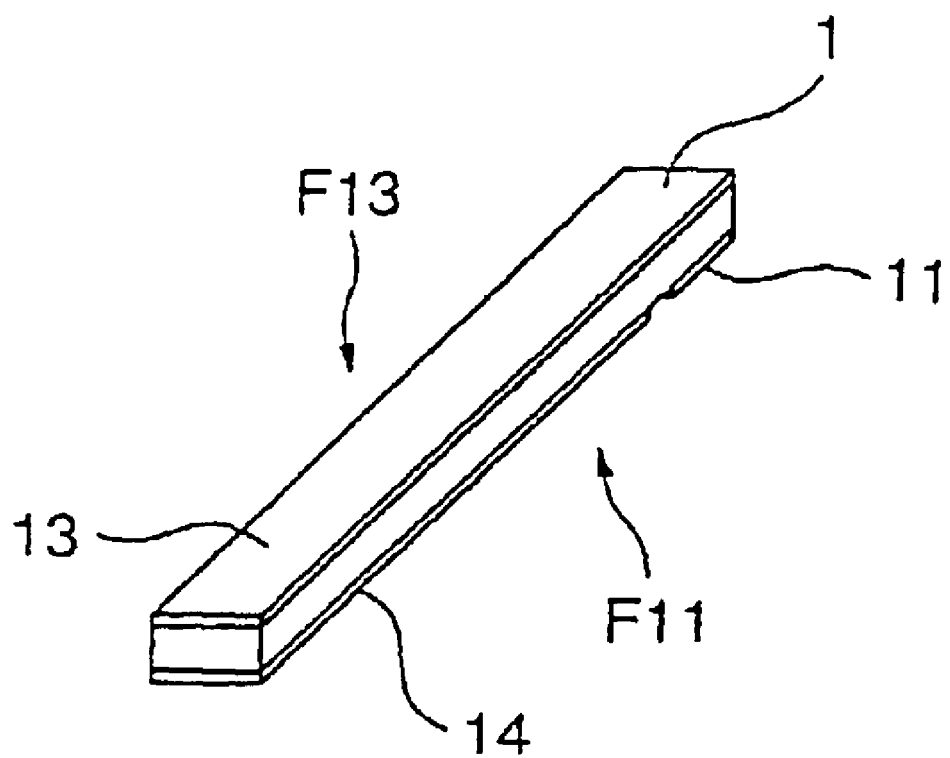
FIG. 9 is a perspective view of an acceleration sensor according to a seventh embodiment of the present invention.

FIG. 9 is a perspective view of an acceleration sensor according to the seventh embodiment of the present invention. In addition to the ground electrode 13 on the side F13A of the LNX-cut plate 1, a ground electrode 14 is provided on the side F11 on which the detection electrodes 11 is provided. By providing the ground electrodes 13 and 14 on both the opposing sides of the LNX-cut plate 1, it is possible to further reduce noise and improve the S/N ratio.

(Eighth Embodiment)

An acceleration sensor according to an eighth embodiment of the present invention is a modification of the acceleration sensor shown in FIG. 9.

Figure 10:
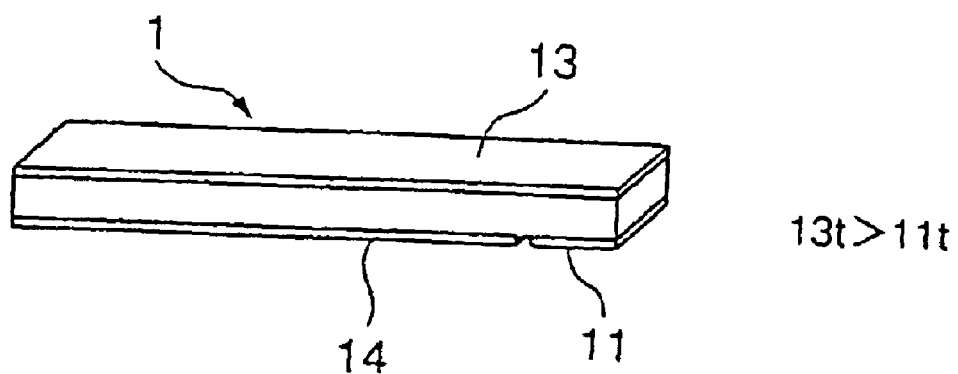
FIG. 10 is a perspective view of an acceleration sensor according to an eighth embodiment of the present invention.

FIG. 10 is a perspective view of an acceleration sensor according to the eighth embodiment of the present invention. The ground electrode 13 has a thickness 13$t$ greater than the thickness l$t$ of the detection electrodes 11. With this structure, it is possible to increase inertia force M exerted on the LNX-cut plate 1 and improve the sensitivity of the acceleration sensor. That is, the sensitivity can be improved by such a simple way that the ground electrode 13 is made thicker by, for example, lengthening the time for plating.

(Ninth Embodiment)

An acceleration sensor according to a ninth embodiment of the present invention in which the detection electrodes and ground electrodes have a density $\rho m$ that is greater than a density $\rho 1$ of the LNX-cut plate in order to further improve the sensitivity.

Figure 11:
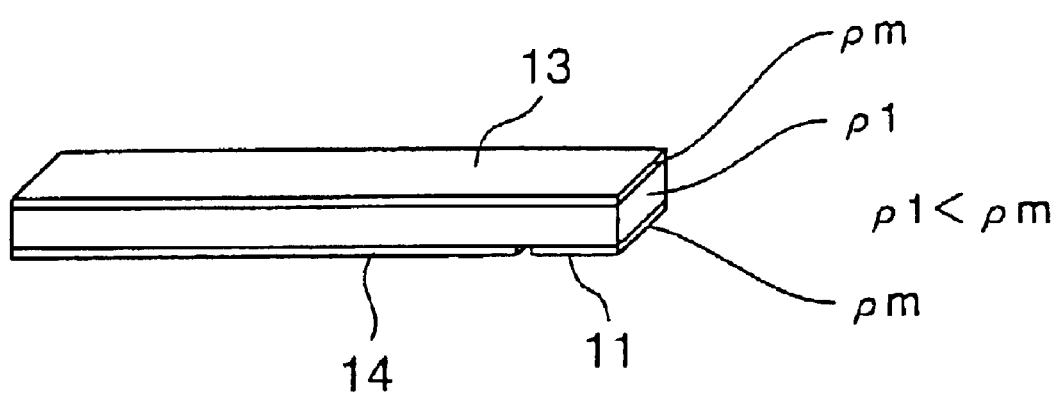
FIG. 11 is a perspective view of an acceleration sensor according to a ninth embodiment of the present invention.

FIG. 11 is a perspective view of an acceleration sensor according to the ninth embodiment of the present invention. The detection electrodes 11 and the ground electrodes 13 and 14 have a density $\rho m$ that is greater than a density $\rho 1$ of the LNX-cut plate 1 in order to further improve the sensitivity. Thus, the mass of the LNX-cut plate 1 can be increased substantially. Hence, the inertia force M can be increased so that the sensitivity of the acceleration sensor can be improved. The density $\rho 1$ of the LNX-cut plate 1 is approximately equal to $4.5 \times 10^{-3}$ Kg/cm$^3$. The detection electrodes 11 and the ground electrodes 13 and 14 can be made of a metal such as gold (Au), nickel (Ni), Aluminum (Al), copper (Cu) or an alloy thereof.

By increasing the density $\rho m$ of the electrodes, it is possible to improve the sensitivity when the LNX-cut plate 1 has a constant size and, in contrast, to thin down the LNX-cut plate 1 when the sensitivity is constant. The present invention can be implemented by merely selecting an electrode substance having a higher density.

It is also possible to modify the arrangement shown in FIG. 11 so that only the ground electrode 13 formed on the surface F13 opposite to the surface F11 on which the detection electrodes 11 are provided is made of a material having a density greater than the density $\rho 1$ of the LNX-cut plate 1.

(Tenth Embodiment)

An acceleration sensor according to a tenth embodiment of the present invention has an arrangement directed to further reducing noise in the acceleration sensors according to the seventh through ninth embodiments of the present invention.

Figure 12A:
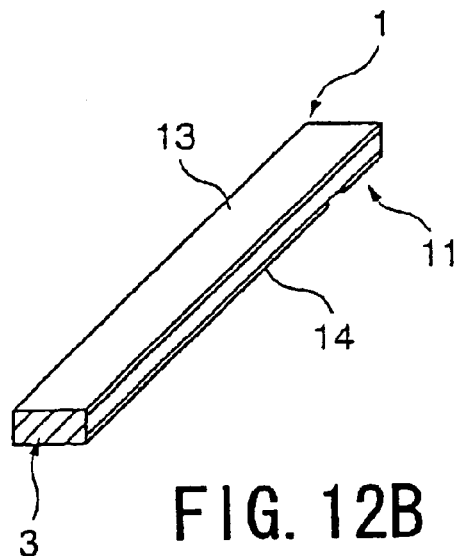
FIGS. 12A, 12B and 12C are perspective views of an acceleration sensor according to a tenth embodiment of the present invention.
Figure 12B:
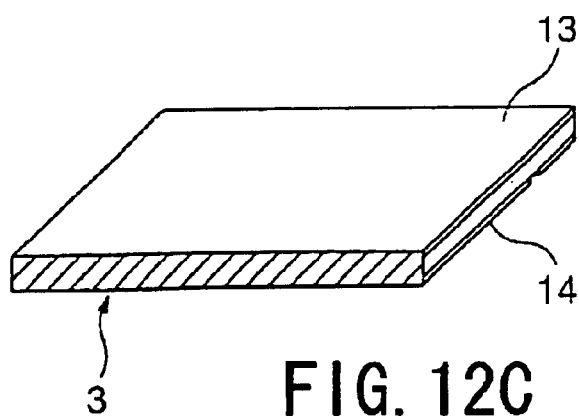
Figure 12C:
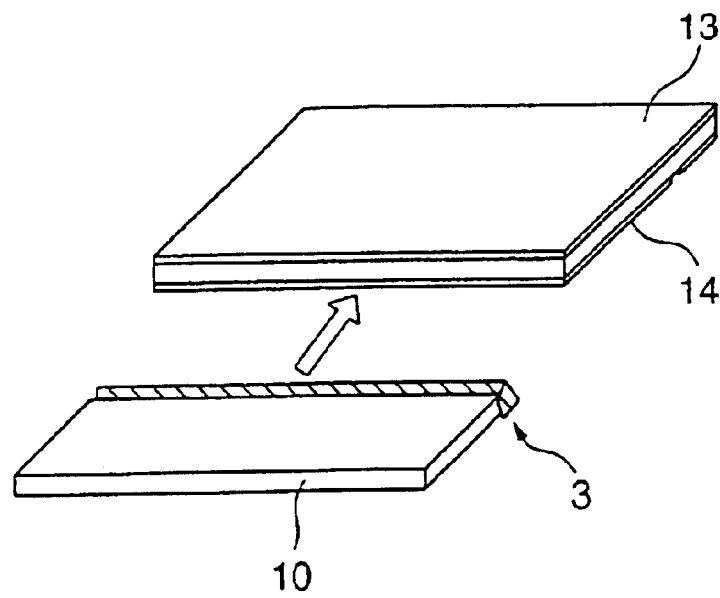

FIGS. 12A, 12B and 12C are diagrams of an acceleration sensor according to the tenth embodiment of the present invention. As shown in FIG. 12A, the ground electrodes 13 and 14 are electrically connected by an electrically conductive resin 3. With this arrangement, it is possible to further reduce noise and improve the S/N ratio. The electrically conductive resin 3 may be epoxy resin which contains a metal such as silver paste or the like.

As shown in FIG. 12B, the original LNX-cut plate which has not been divided into the individual chips can be coated with the electrically conductive resin 3 by screen printing. Alternatively, as shown in FIG. 12C, the electrically conductive resin 3 may be attached to the original LNX-cut plate by a stamping process in which the resin 3 is attached to an edge of a stamping tool 10.

(Eleventh Embodiment)

An eleventh embodiment of the present invention is a method of fabricating the acceleration sensors in which an electrode pattern can be formed efficiently, whereby cost reduction is facilitated.

Figure 13:
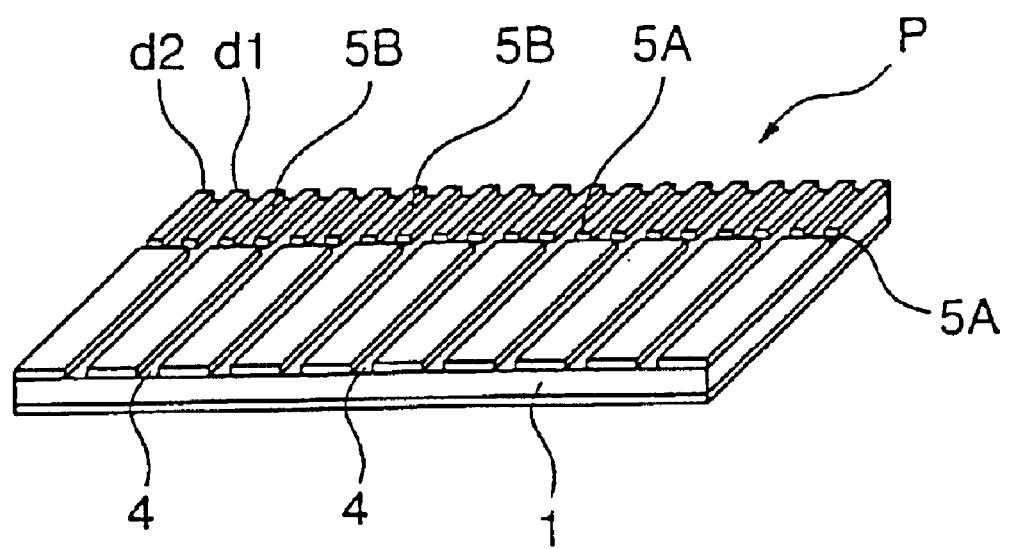
FIG. 13 is a perspective view of an acceleration sensor according to an eleventh embodiment of the present invention.

FIG. 13 is a perspective view of an intermediate device from which individual acceleration sensors can be produced.

The LNX-cut plate 1 of the intermediate plate has cutting grooves 4 for dividing the intermediate device into chips and grooves 5A and 5B for defining the electrodes. The grooves 4, 5A and 5B can simply be formed by etching, dicing or sand blast. The use of the intermediate device shown in FIG. 13 enhances mass productivity and reduces the cost. The piezoelectric single-plate made of a piezoelectric single crystal is used as the piezoelectric element. This facilitates mass productivity.

(Twelfth Embodiment)

An acceleration sensor according to a twelfth embodiment of the present invention has a unique arrangement in which a surface thereof is reinforced in order to enhance the durability of the sensor.

Figure 14:
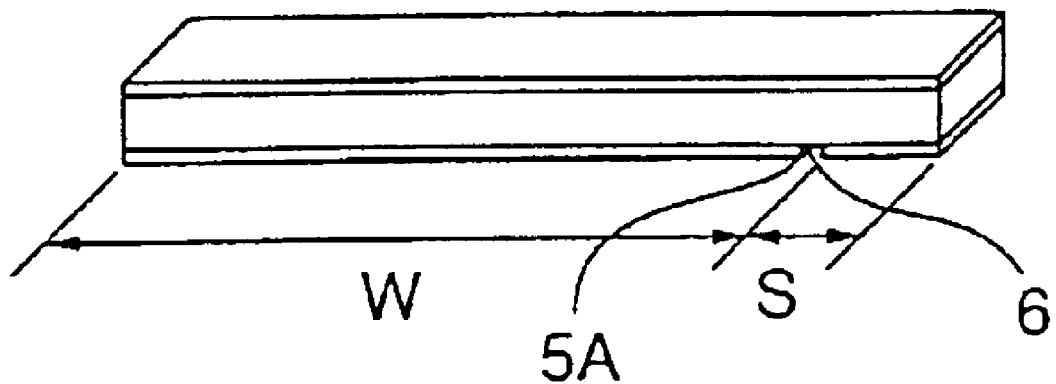
FIG. 14 is a perspective view of an acceleration sensor according to a twelfth embodiment of the present invention.

FIG. 14 is a perspective view of an acceleration sensor according to the twelfth embodiment of the present invention. The groove 5A for separating the weight part W and the detection part D is filled with insulating resin 6. With this arrangement, it is possible to prevent crack from being caused in the vicinity of the groove 5A due to external shock or the like. Although not illustrated, it is preferable to fill the grooves 5A between the detection electrodes 11-1 and 11-2 shown in FIG. 13 with insulating resin. The insulating resin 6 may be an epoxy-based or silicon-based material.

(Thirteenth Embodiment)

A thirteenth embodiment of the present invention employs lithography technique in order to efficiently form an electrode pattern on the surfaces of the LNX-cut plate and thus reduce the fabrication cost.

Figure 15:
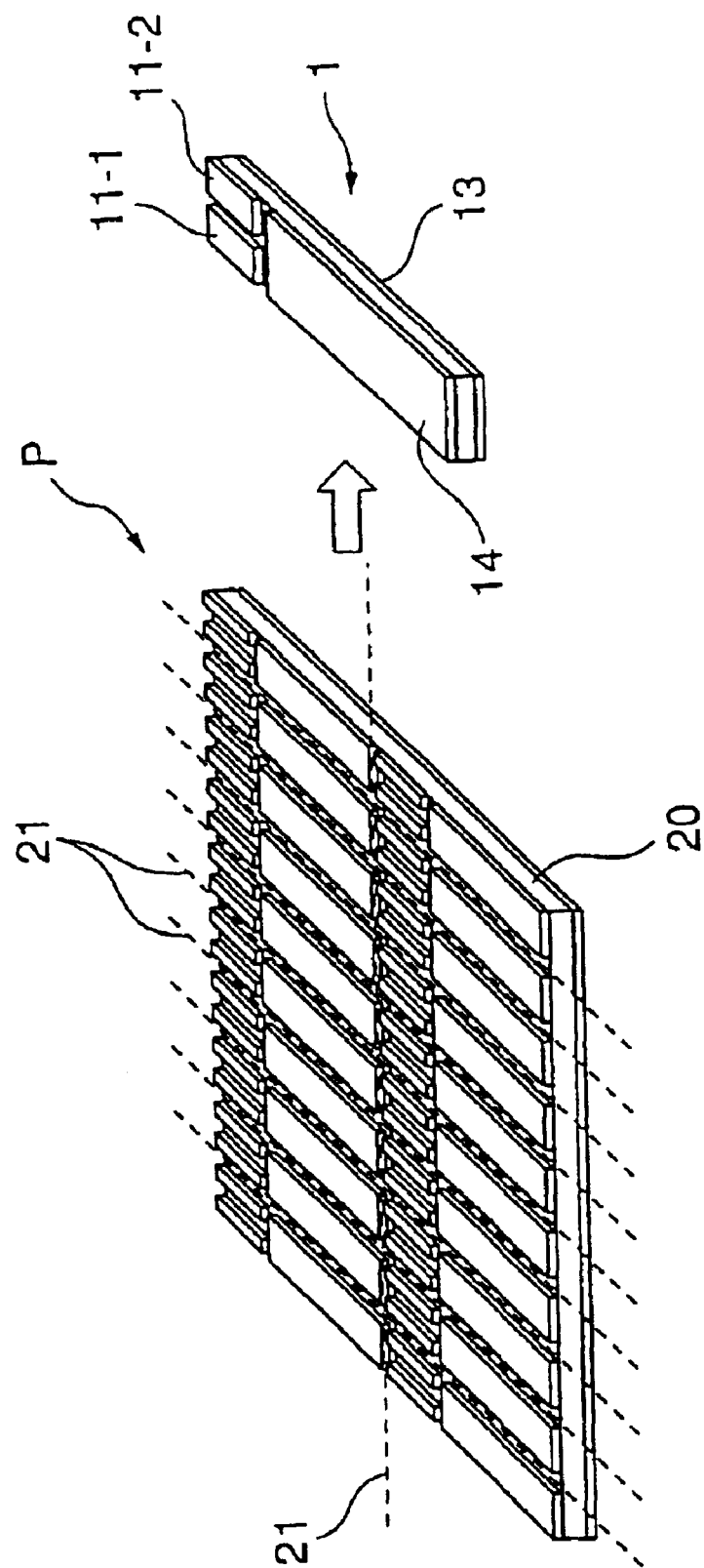
FIG. 15 is a perspective view of an acceleration sensor according to a thirteenth embodiment of the present invention.

FIG. 15 is a perspective view of the thirteenth embodiment of the present invention. A large number of electrode patterns P can be formed on a wafer 20 (which is a piezoelectric single-crystal plate of $LiNbO_3$) at once by a lithographic process including resist coat, pattern exposure, development and resist removal. The wafer 20 is cut by dicing or the like, so that a large number of LNX-cut plates with the electrodes being already formed thereon can be efficiently obtained. This contributes to cost reduction.

(Fourteenth Embodiment)

A fourteenth embodiment of the present invention is an acceleration sensor equipped with a support member for supporting the LNX-cut plate 1.

Figure 16:
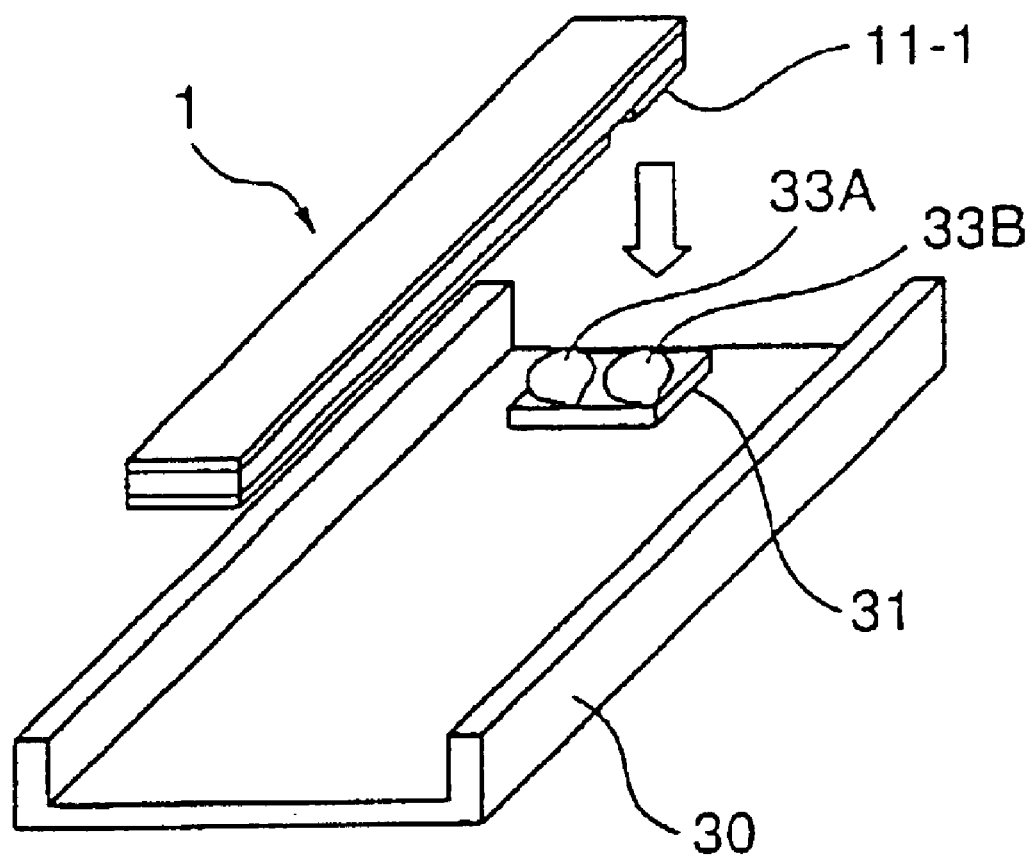
FIG. 16 is a perspective view of an acceleration sensor according to a fourteenth embodiment of the present invention.

FIG. 16 is a perspective view of an acceleration sensor according to the fourteenth embodiment of the present invention. The detection electrodes 11-1 and 11-2 provided on the LNX-cut plate 1 are attached to a supporting base 31 of a package 30 by means of electrically conductive adhesive agents 33A and 33B. Two electrode terminals (hidden by the adhesive agents 33A and 33B in FIG. 16) for picking up the electric signals caused by acceleration a applied to the LNX-cut plate 1 are provided on the supporting base 31 so as to be isolated from each other. The detection electrode 11-2 (hidden in FIG. 16) is electrically connected to one of the electrode terminals by the adhesive agent 33A, and the detection electrode 11-1 is electrically connected to the other electrode terminal by the adhesive agent 33B. The adhesive agents 33A and 33B are provided so as to be isolated from each other.

It is to be noted that the electrically conductive adhesive agents 33A and 33B act to simultaneously make electrical and mechanical connections between the supporting base 31 and the LNX-cut plate 1. Hence, it is possible to improve the efficiency of mass production and achieve cost reduction.

(Fifteenth Embodiment)

An acceleration sensor according to a fifteenth embodiment of the present invention employs anisotropic electrically conductive adhesive agents.

Figure 17:
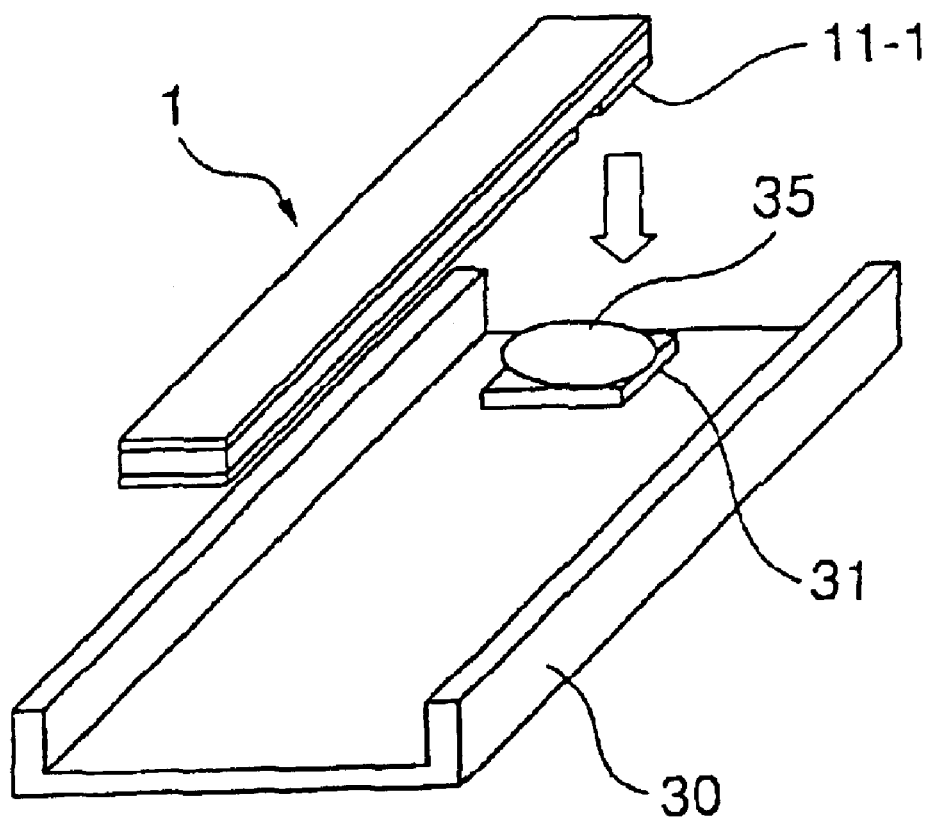
FIG. 17 is a perspective view of an acceleration sensor according to a fifteenth embodiment of the present invention.

FIG. 17 is a perspective view of an acceleration sensor according to the fifteenth embodiment of the present invention. The detection electrodes 11-1 and 11-2 is bonded to the supporting base 31 of the package 30 by an anisotropic electrically conductive adhesive agent 35. The adhesive agent 35 acts to electrically connect the detection electrodes 11-1 and 11-2 to the corresponding electrode terminals (hidden by the adhesive agent 35 in FIG. 17) formed on the supporting base 31 while electrically isolating the detection electrodes 11-1 and 11-2 from each other. That is, the adhesive agent allows charges to pass only in the vertical direction with respect to the bonding surfaces, and does not allow charges to flow in any directions other than the vertical direction. Hence, it is no need to consider the possibility of short-circuiting between the adjacent electrodes. Thus, the mass productivity can be further improved and the cost may be reduced.

(Sixteenth Embodiment)

Figure 18A:
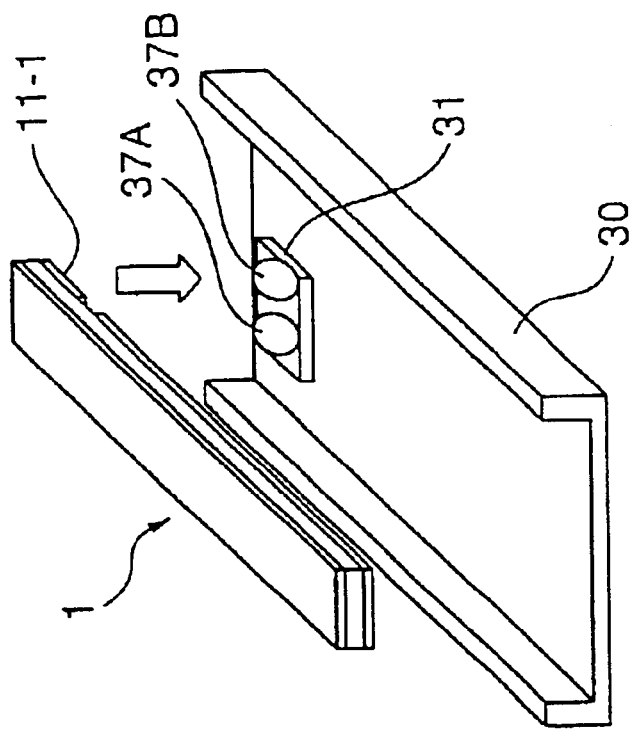
FIGS. 18A and 18B are perspective views of acceleration sensors according to a sixteenth embodiment of the present invention.

FIG. 18A is a perspective view of an acceleration sensor according to a sixteenth embodiment of the present invention. The LNX-cut plate 1 is bonded to the supporting base 31 by solder bumps 36A and 36B. More particularly, the detection electrodes 11-1 and 11-2 are electrically connected to the electrode terminals formed on the supporting base 31 by the solder bumps 36B and 36A, respectively. In addition, the solder bumps 36A and 36B act to mechanically support the LNX-cut plate 1 by supporting base 31. In FIG. 18A, two solder bumps 36B are given to the detection electrode 11-2, and two solder bumps 36B are given to the detection electrode 11-1. The solder bumps 36A and 36B are electrically isolated from each other.

Figure 18B:
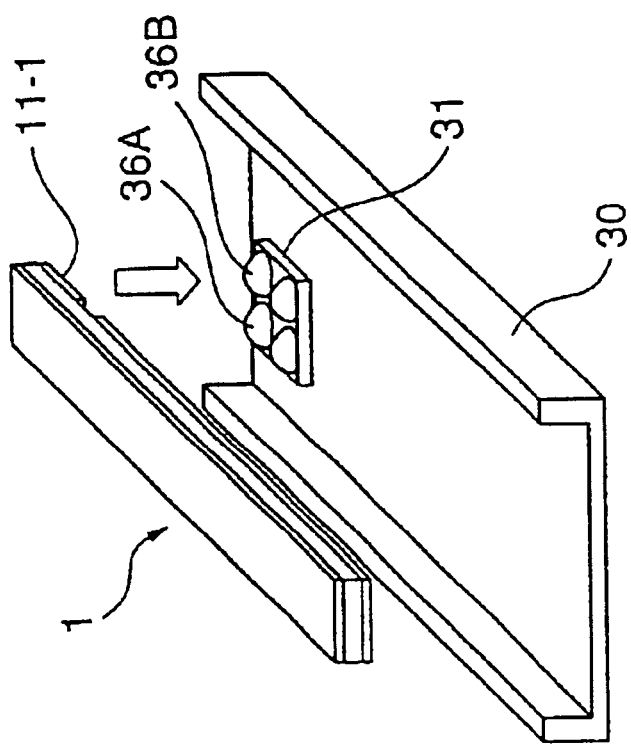

FIG. 18B shows a modification of the acceleration sensor shown in FIG. 18A. The solder bumps 36A and 36B are replaced by cream solders 37A and 37B, which can be provided by a reflow process.

(Seventeenth Embodiment)

Figure 19:
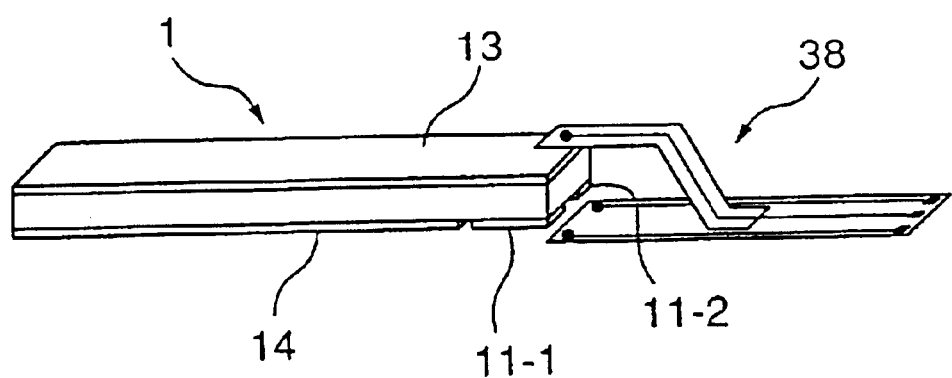
FIG. 19 is a perspective view of an acceleration sensor according to a seventeenth embodiment of the present invention.

FIG. 19 is a perspective view of an acceleration sensor according to a seventeenth embodiment of the present invention. A flexible printed-circuit cable 38 is used to pick up the electric signals from the LNX-cut plate 1. More particularly, the flexible printed-circuit cable 38 includes wires and terminals indicated by dots in FIG. 19, which terminals are connected to the detection electrodes 11-1 and 11-2 and the ground electrode 13. The ground electrode 14 is electrically connected as shown in FIG. 12A, for example. The use of the flexible printed-circuit cable 38 improves the degree of freedom in wiring. The flexible printed-circuit cable 38 has other electrodes to be connected to the electrode terminals provided on the package.

(Eighteenth Embodiment)

Figure 20:
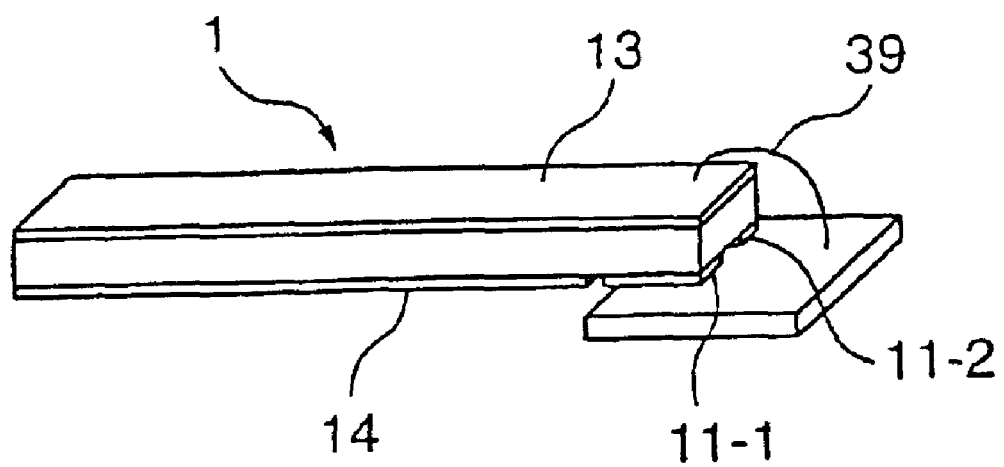
FIG. 20 is a perspective view of an acceleration sensor according to an eighteenth embodiment of the present invention.

FIG. 20 is a perspective view of an acceleration sensor according to an eighteenth embodiment of the present invention. A wire 39 is used to electrically connect the ground electrode 13 and the corresponding electrode terminal formed on the supporting base 31. The wire 39 can be provided by ribbon bonder or wire bonding. Similarly, wires (not shown) can be used to make connections between the detection electrodes 11-1 and 11-2 and the corresponding electrode terminals formed on the supporting base 31. Such connections may be made by the electrically conductive adhesive agents, solder bumps, or the like.

(Nineteenth Embodiment)

Figure 21A:
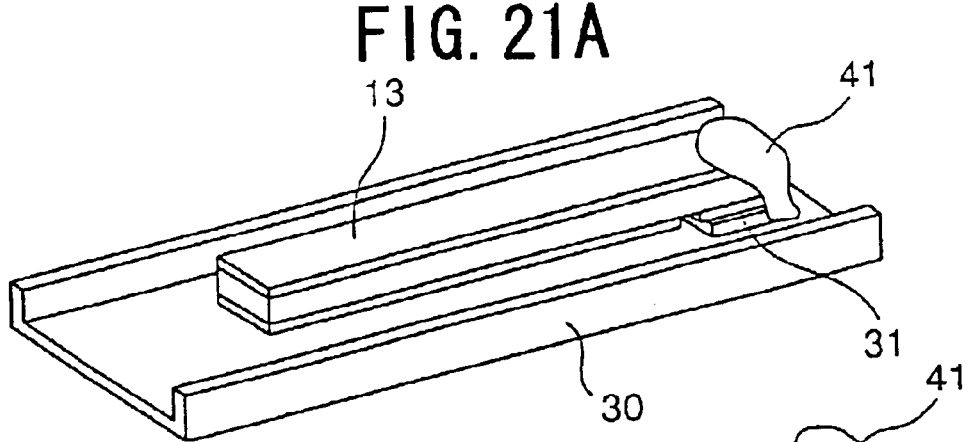
FIGS. 21A, 21B and 21C are respectively perspective views of an acceleration sensor according to a nineteenth embodiment of the present invention.
Figure 21B:
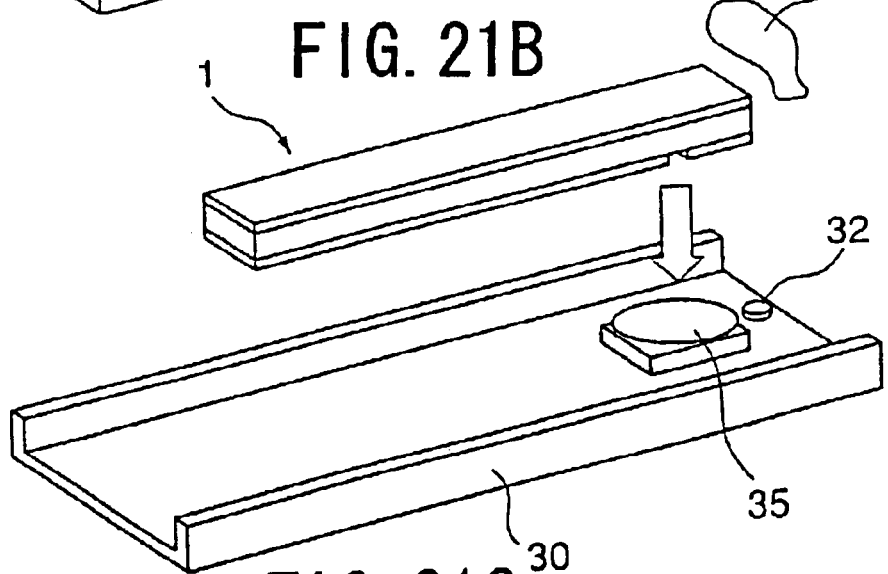
Figure 21C:
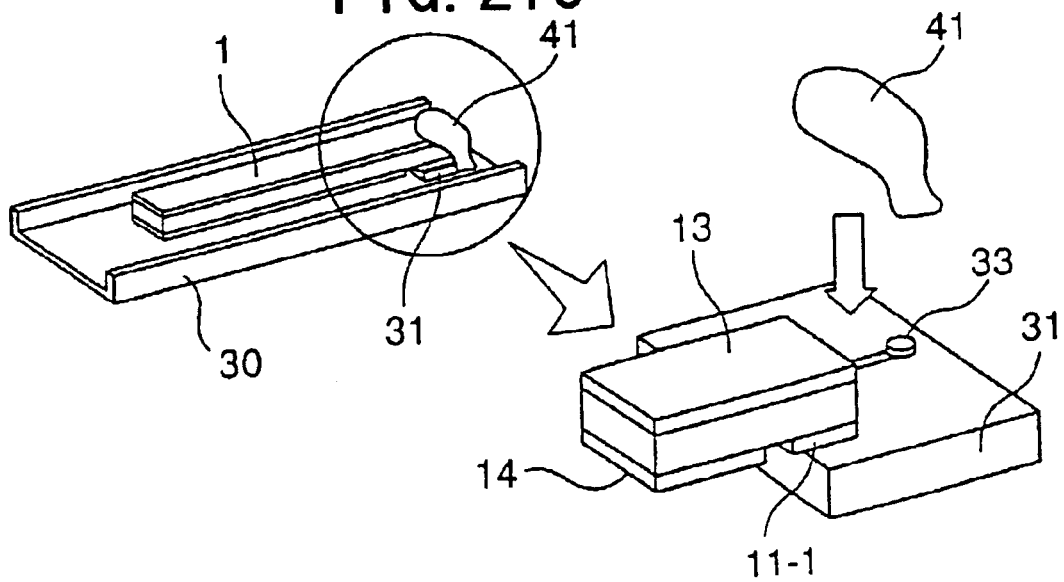

FIGS. 21A, 21B and 21C are perspective views of an acceleration sensor according to a nineteenth embodiment of the present invention. As shown in FIG. 21A, the LNX-cut plate 1 is supported by and electrically connected to the supporting base 31 by any of the above-mentioned ways.

Further, an electrically conductive resin 41 is provided by potting or the like to make an electrical connection between the ground electrode 13 and a conductive pattern (hidden by the conductive resin 41) provided on the package 30.

For example, as shown in FIG. 21B, the anisotropic electrically conductive adhesive agent 35 is used to make electrical and mechanical connections between the LNX-cut plate 1 and the supporting base 31. Even if the adhesive agent 35 overflows from the bonding surfaces, no problem will occur because the adhesive agent 35 is an anisotropic resin. A ground pad 32 is provided on the inner bottom surface of the package 30, and is electrically connected to the ground electrode 13 by the conductive resin 41. Even if the conductive resin 41 may contact any of the detection electrodes 11-1 and 11-2, no problem will occur because the conductive resin 41 is anisotropic.

FIG. 21C shows a variation of the acceleration sensor shown in FIGS. 21A and 21B. A pad 33 for grounding is provided on the inner bottom surface of the package 30. A lead line 33a is connected to the pad 33 and is electrically connected to the ground electrode 14 by any of the above-mentioned ways. The anisotropic electrically conductive resin 41 connects the ground electrodes 13 and 14. Hence, it is no longer necessary to employ the way shown in FIG. 12A in order to connect the electrodes 13 and 14.

According to the nineteenth embodiment of the present invention, it is possible to reduce noise by the simple structure using the conductive resin 41 and thus improve the S/N ratio.

(Twentieth Embodiment)

Figure 22A:
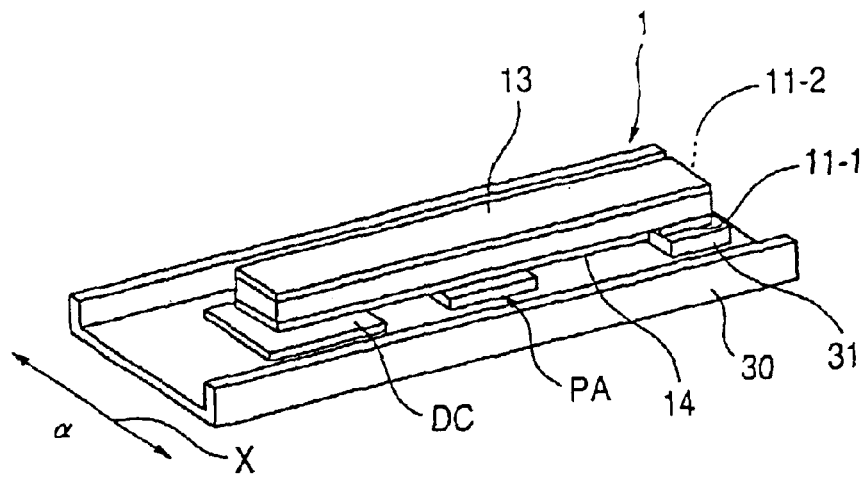
FIG. 22A is a perspective view of an acceleration sensor according to a twentieth embodiment of the present invention.
Figure 22B:
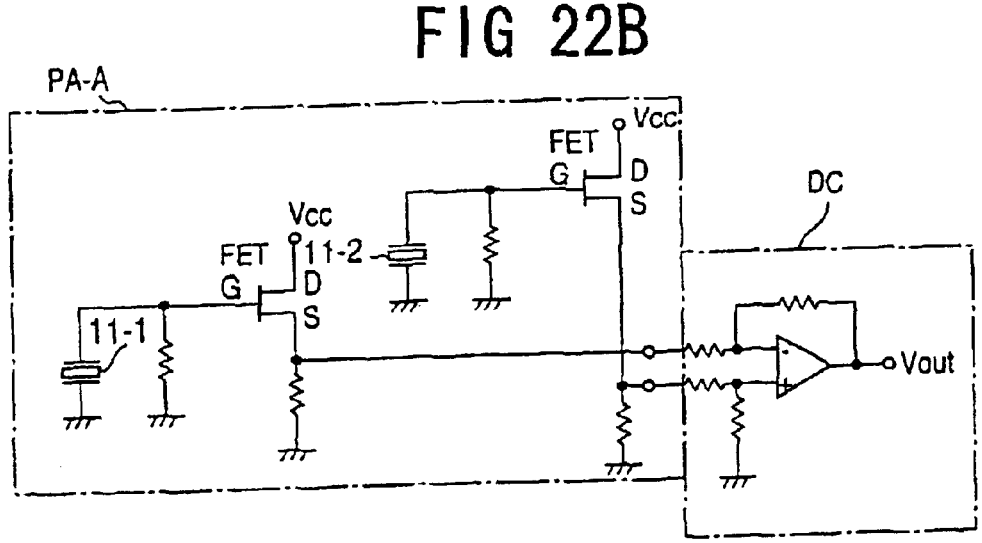
FIG. 22B is a circuit diagram of a preamplifier and a detection circuit packaged together with a piezoelectric single-plate according to the twentieth embodiment of the present invention.
Figure 22C:
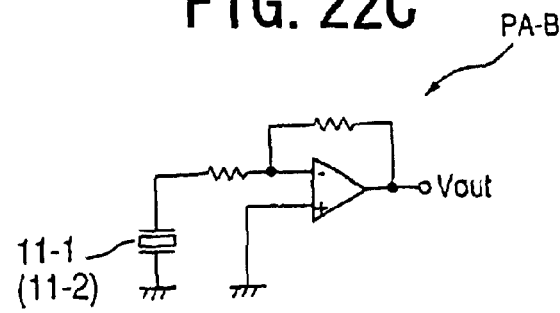
FIG. 22C is a circuit diagram of another configuration of the preamplifier.

FIGS. 22A, 22B and 22C show an acceleration sensor according to a twentieth embodiment of the present invention.

As shown in FIG. 22A, a preamplifier AP and a detection circuit DC are packaged together with the LNX-cut plate 1 supported by the supporting base 31. The preamplifier PA and the detection circuit DC are provided on the inner bottom surface of the package 30 and are located below the LNX-cut plate 1 so as to be arranged side by side. Since the preamplifier AP and the detection circuit DC are packaged, connections among these structural elements can be made by short wiring lines. Particularly, the wiring distance between the preamplifier AP and the detection circuit DC can be reduced, so that noise can greatly be reduced and the SIN ratio can greatly be improved. In addition to the above advantages, the preamplifier AP, the detection circuit DC and the LNX-cut plate 1 are incorporated into the single package 30, whereby the compact acceleration sensor system including the detection circuit DC can be provided.

FIG. 22B is a circuit diagram of the preamplifier AP and the detection circuit DC. The preamplifier AP amplifies the electric signals trapped by the detection electrodes 11-1 and 11-2 with impedance conversion. The preamplifier AP includes two field effect transistors (FET) respectively associated with the detection electrodes 11-1 and 11-2. The detection circuit DC includes an operational amplifier, which acts as a differential amplifier amplifying the electric signals from the preamplifier PA. Each of the FETs shown in FIG. 22B may be replaced by an amplifier using an operational amplifier shown in FIG. 22C.

(Twenty-First Embodiment)

Figure 23:
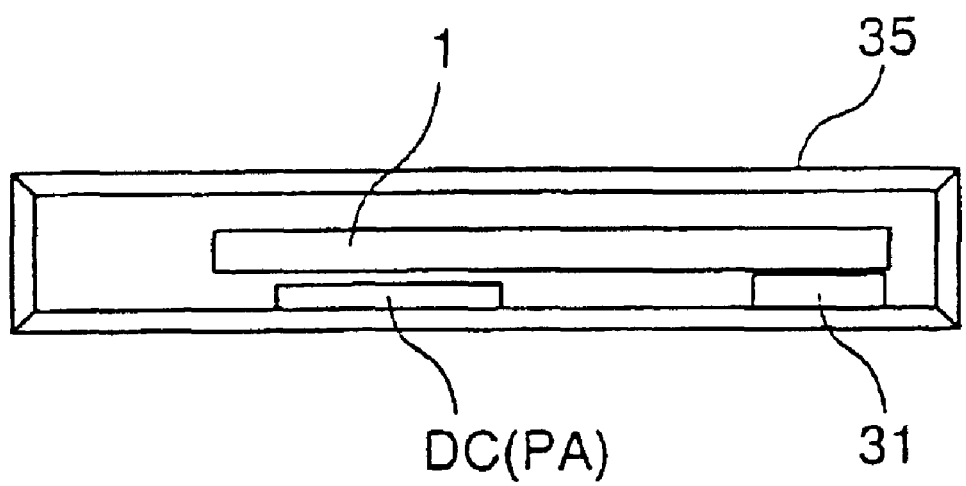
FIG. 23 is a cross-sectional view of an acceleration sensor according to a twenty-first embodiment of the present invention.

FIG. 23 is a cross-sectional view of a totally packaged acceleration sensor according to a twenty-first embodiment of the present invention. A package 35 hermetically seals the detection circuit DC with the preamplifier PA incorporated therein, and the LNX-cut plate 1 supported by the supporting base 31. The detection circuit DC is located below the LNX-cut plate 1.

(Twenty-Second Embodiment)

Figure 24B:
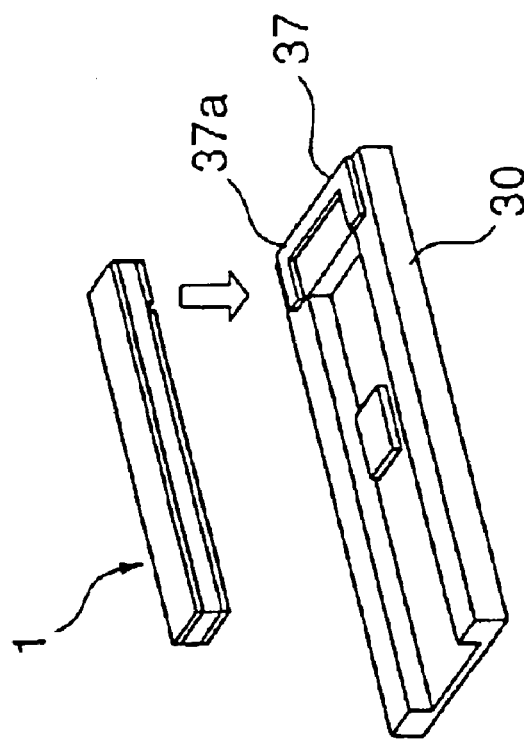
FIG. 24B is a perspective view of a variation of the acceleration sensor shown in FIG. 24A.
Figure 24A:
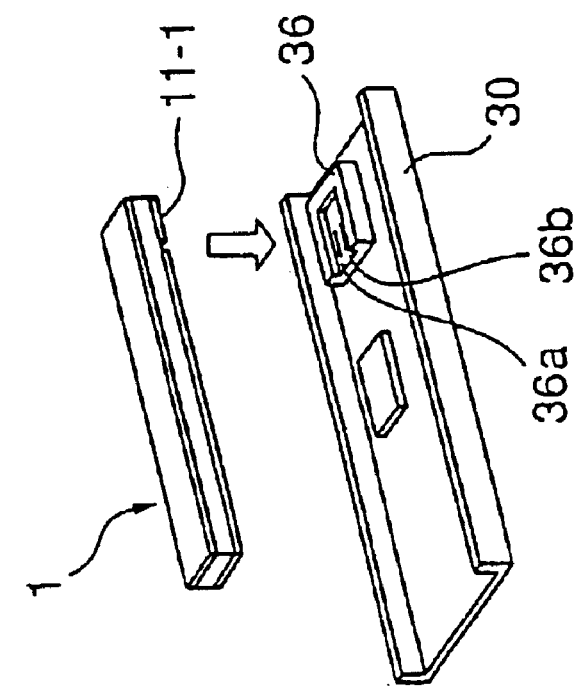
FIG. 24A is a perspective view of an acceleration sensor acceleration sensor according to a twenty-second embodiment of the present invention.

FIGS. 24A and 24B show an acceleration sensor according to a twenty-second embodiment of the present invention.

Referring to FIG. 24A, a guide base 36 for positioning and supporting the LNX-cut plate 1 is provided on the inner bottom surface of the package 30. The guide base 36 is a recess portion with which the LNX-cut plate 1 can engage. Electrode terminals 36a and 36 are provided in the recess portion of the guide plate 36. When the LNX-cut plate 1 is inserted into the recess portion of the guide base 36 and is placed in position, the detection electrodes 11-1 and 11-2 of the LNX-cut plate 1 are brought into contact with the electrode terminals 36a and 36b.

FIG. 24B shows a guide base 37a for positioning and supporting the LNX-cut plate 1. A wall 37 connecting two edges of the package 30 extending in the longitudinal directions is formed. The guide base 37a is provided on the top of the wall 37, so that a recess portion for accommodating the end of the LNX-cut plate 1 can be defined.

The present invention is not limited to the specifically disclosed embodiments, and variations and modifications may be made without departing from the scope of the present invention.

The present application is based on Japanese priority application no. 2000-42053 filed on Feb. 28, 2000, the entire contents of which are hereby incorporated by reference.

What is claimed is:

1. An acceleration sensor comprising:
    a piezoelectric single-plate having a weight part and a detection part;
    a detection electrode provided on a first surface of the piezoelectric single-plate, an electric signal caused by inertia force exerted onto the weight part resulting from acceleration being output via the detection electrode; and
    a ground electrode provided on a second surface of the piezoelectric single-plate opposite to the first surface;
    wherein the detection electrode includes two electrode parts arranged side by side in a main axis direction in which the acceleration is applied to the acceleration sensor.

2. The acceleration sensor as claimed in claim 1, wherein the piezoelectric single-plate has a supporting position which does not include a center of gravity of the piezoelectric single-plate.

3. The acceleration sensor as claimed in claim 1, wherein the piezoelectric single-plate has a supporting position which includes a center of gravity of the piezoelectric single-plate.

4. The acceleration sensor as claimed in claim 1, wherein the piezoelectric single-plate has a supporting position with which the detection electrode overlaps.

5. The acceleration sensor as claimed in claim 1, wherein the piezoelectric single-plate is an X-cut plate of LiNbO3.

6. The acceleration sensor as claimed in claim 1, further comprising another ground electrode provided on the first surface of the piezoelectric single-plate.

7. The acceleration sensor as claimed in claim 1, wherein the ground electrode is thicker than the detection electrode.

8. The acceleration sensor as claimed in claim 1, wherein the detection electrode and the ground electrode have respective densities that are greater than a density of the piezoelectric single plate.

9. The acceleration sensor as claimed in claim 6, further comprising an electrically conductive resin that electrically connects the ground electrode and said another ground electrode.

10. The acceleration sensor as claimed in claim 6, further comprising an insulating resin provided in a groove that separates the detection electrode and said another ground electrode from each other.

11. The acceleration sensor as claimed in claim 1, further comprising:

a package to which the piezoelectric single-plate is attached;

an electrode terminal provided on the package; and an electrically conductive adhesive agent which attaches the piezoelectric single-plate to the package and electrically connects the detection electrode and the electrode terminal.

12. The acceleration sensor as claimed in claim 1, further comprising:

a package to which the piezoelectric single-plate is attached;

an electrode terminal provided on the package; and an anisotropic electrically conductive adhesive agent which attaches the piezoelectric single-plate to the package and electrically connects the detection electrode and the electrode terminal.

13. The acceleration sensor as claimed in claim 1, further comprising a flexible printed-circuit cable to which the detection electrode and the ground electrode are connected.

14. The acceleration sensor as claimed in claim 1, further comprising a wire connecting the detection electrode and the ground electrode to electrode terminals formed on a member by which the piezoelectric single-plate is supported.

15. The acceleration sensor as claimed in claim 1, further comprising:

a package which accommodates the piezoelectric single-plate;

and an electrically conductive resin which electrically connects the ground electrode to an electrode terminal provided on the package.

16. The acceleration sensor as claimed in claim 1, further comprising:

an electric circuit that processes an electric signal output from the piezoelectric single-plate; and a package which accommodates the electric circuit and the piezoelectric single-plate.

17. The acceleration sensor as claimed in claim 16, wherein the package is provided with a guide base positioning and supporting the piezoelectric single-plate.

18. The acceleration sensor as claimed claim 16, wherein the electric circuit is located below the piezoelectric single-plate.

* * * * *